United States Patent
Yoshida et al.

(10) Patent No.: US 9,683,557 B2
(45) Date of Patent: Jun. 20, 2017

(54) SOLAR HEAT STEAM CYCLE SYSTEM

(75) Inventors: Takuya Yoshida, Tokyo (JP); Naoyuki Nagafuchi, Tokyo (JP); Hideki Ono, Tokyo (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 477 days.

(21) Appl. No.: 14/002,145

(22) PCT Filed: Mar. 7, 2011

(86) PCT No.: PCT/JP2011/001305
§ 371 (c)(1),
(2), (4) Date: Oct. 10, 2013

(87) PCT Pub. No.: WO2012/120556
PCT Pub. Date: Sep. 13, 2012

(65) Prior Publication Data
US 2014/0020383 A1   Jan. 23, 2014

(51) Int. Cl.
F24J 2/07     (2006.01)
F03G 6/06     (2006.01)
(Continued)

(52) U.S. Cl.
CPC .............. *F03G 6/003* (2013.01); *F01K 3/004* (2013.01); *F01K 3/16* (2013.01); *F01K 3/18* (2013.01);
(Continued)

(58) Field of Classification Search
CPC ... Y02E 10/46; Y02E 10/44; F24J 2/07; F24J 2/34; F03G 6/065; F03G 6/00;
(Continued)

(56) References Cited

U.S. PATENT DOCUMENTS

| 4,449,517 A | 5/1984 | Tani et al. |
| 6,581,368 B2 | 6/2003 | Utamura |

(Continued)

FOREIGN PATENT DOCUMENTS

| DE | 4243401 A1 | 6/1994 |
| JP | 57-150757 A | 9/1982 |
| JP | 59-180016 A | 10/1984 |
| JP | 62-96704 A | 5/1987 |
| JP | 5-272306 A | 10/1993 |
| JP | 9-236024 A | 9/1997 |
| JP | 2007-132330 A | 5/2007 |
| JP | 2008-039367 A | 2/2008 |
| JP | 2010-190460 A | 9/2010 |

OTHER PUBLICATIONS

International Search Report (PCT/ISA/210) including English translation dated May 24, 2011 (five (5) pages).
(Continued)

Primary Examiner — Mark Laurenzi
Assistant Examiner — Wesley Harris
(74) Attorney, Agent, or Firm — Crowell & Moring LLP

(57) ABSTRACT

An object of the present invention is to provide a solar heat steam cycle system capable of operating efficiently and stably in keeping with the status of collected or stored heat, and a control method for use with the system.
The system includes a heat collector (1) which collects solar thermal energy, a thermal storage device (2) which stores the solar thermal energy collected by the heat collector, a feed water heater (3) which heats feed water, an evaporator (4) which evaporates the feed water supplied from the feed water heater, and a steam turbine (6) driven by steam generated by the evaporator. The system includes a control valve (31) which controls allocations of heating medium supplied from the thermal storage device to the evaporator and the feed water heater.

13 Claims, 7 Drawing Sheets

(51) Int. Cl.
  *F03G 6/00* (2006.01)
  *F01K 3/16* (2006.01)
  *F01K 3/18* (2006.01)
  *F24J 2/34* (2006.01)
  *F01K 3/00* (2006.01)

(52) U.S. Cl.
  CPC .............. *F03G 6/00* (2013.01); *F03G 6/005* (2013.01); *F03G 6/065* (2013.01); *F03G 6/067* (2013.01); *F24J 2/07* (2013.01); *F24J 2/34* (2013.01); *Y02E 10/44* (2013.01); *Y02E 10/46* (2013.01)

(58) Field of Classification Search
  CPC .......... F03G 6/067; F03G 6/003; F03G 6/005; F01K 3/16; F01K 3/18
  USPC ........................................... 60/641.8–641.15
  See application file for complete search history.

(56) References Cited

U.S. PATENT DOCUMENTS

| 8,468,827 | B2 | 6/2013 | Ota | |
|---|---|---|---|---|
| 2009/0125152 | A1* | 5/2009 | Skowronski | F22D 1/003 700/281 |
| 2009/0320828 | A1* | 12/2009 | Koketsu | F01K 3/18 126/585 |
| 2011/0127773 | A1* | 6/2011 | Freund | F01K 23/10 290/52 |

OTHER PUBLICATIONS

Written Opinion (PCT/ISA/237) and English translation dated May 24, 2011 (eight (8) pages).

* cited by examiner

SOLAR HEAT STEAM CYCLE SYSTEM

TECHNICAL FIELD

The present invention relates to a system that drives a steam turbine using solar heat.

BACKGROUND ART

Recent years have witnessed the development and expansion of power generating systems that utilize hitherto-underused natural energy in an effort to make efficient use of energy resources. One such system utilizing natural energy is a solar heat power generating system.

Generally, the solar heat power generating system converts the radiant heat of the sun collected by a heat collector into sensible heat of heating media such as oil, stores the sensible heat thus obtained in a thermal storage device, and feeds the stored heat to an evaporator to generate steam that drives a steam turbine to generate electric power. One such system configuration is described in Patent Literature 1, for example. Also, Patent Literature 2 describes an example whereby the heat collected into the thermal storage device is not fed to the evaporator but supplied to heat the feed water to the evaporator.

PRIOR ART LITERATURE

Patent Literature

Patent Literature 1: JP-1984-180016-A
Patent Literature 2: JP-2007-132330-A

SUMMARY OF THE INVENTION

Problems to be Solved by the Invention

In a solar heat steam cycle system, the amount of collected solar heat on the supply side fluctuates differently from the demand for electric power on the demand side. This system is thus required to manage the balance of supply and demand in a manner maintaining stable and efficient operation. On this point, conventional techniques represented by the above-cited literatures 1 and 2 have not elaborated minutely in terms of how to configure, operate, and control a solar heat steam cycle system that should run efficiently in keeping with the status of collected and stored heat and with the fluctuations in the demand for electric power.

An object of the present invention is to provide a solar heat steam cycle system capable of operating efficiently and stably in keeping with the status of collected or stored heat, and a control method for use with the system.

Means for Solving the Problem

In carrying out the object above, the present invention provides a solar heat steam cycle system including: a heat collector which collects solar thermal energy; a thermal storage device which stores the solar thermal energy collected by the heat collector; a feed water heater which heats feed water; an evaporator which evaporates the feed water supplied from the feed water heater; and a steam turbine driven by steam generated by the evaporator. The system includes a control valve which controls the allocations of heating medium supplied from the thermal storage device to the evaporator and the feed water heater.

There is also provided a solar heat steam cycle system including: a heat collector which collects solar thermal energy; a feed water heater which heats feed water; an evaporator which evaporates the feed water supplied from the feed water heater; and a steam turbine driven by steam generated by the evaporator. The system includes a control valve which controls the allocations of heating medium supplied from the heat collector to the evaporator and the feed water heater.

There is further provided a solar heat steam cycle system including: a heat collector which collects solar thermal energy; a thermal storage device which stores the solar thermal energy collected by the heat collector; a feed water heater which heats feed water; an evaporator which evaporates the feed water supplied from the feed water heater; and a steam turbine driven by steam generated by the evaporator. The system includes a control valve which controls the allocations of heating medium supplied from the heat collector to the evaporator, the feed water heater, and the thermal storage device.

Effect of the Invention

According to the present invention, there can be provided a solar heat steam cycle system capable of operating efficiently and stably in keeping with the status of collected or stored heat, and a control method for use with the system.

MODE FOR CARRYING OUT THE INVENTION

Figure 1:
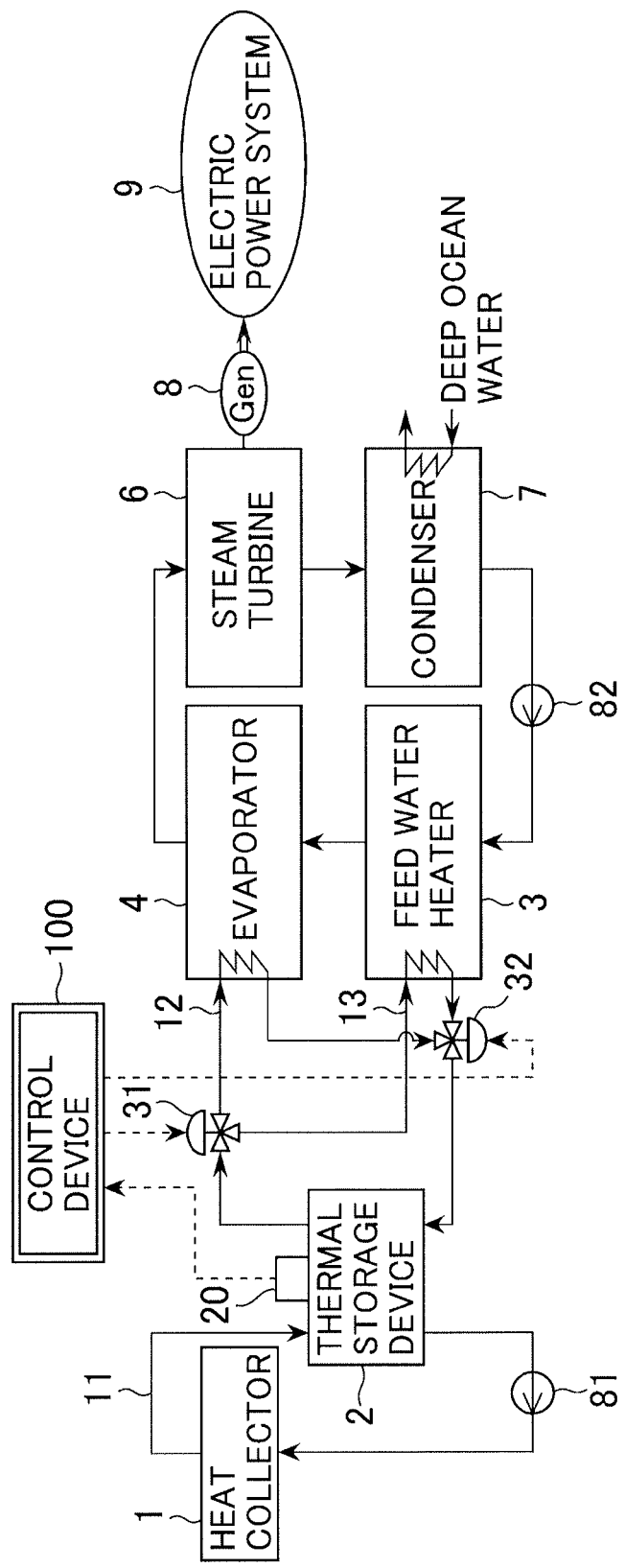
FIG. 1 is a configuration diagram of a solar heat steam cycle system as one embodiment of the present invention.

In the solar heat steam cycle system, the amount of collected solar heat on the supply side fluctuates differently from the demand for electric power on the demand side. This has made it difficult for the system to manage the balance of supply and demand in a manner maintaining highly efficient operation. In particular, changes in the amount of solar radiation trigger fluctuations in steam pressure, leading to the problem of being incapable of keeping the efficiency of the steam turbine maximized.

In view of such circumstances, the embodiments of the present invention (to be detailed hereunder) are outlined as follows:

(1) There is provided a collected heat switch line made up of valves and piping for switching the destination to which the sensible heat of a heating medium is supplied, between an evaporator, a feed water heater and a thermal storage device depending on the status of collected heat in a heat collector.

(2) There is provided a stored heat switch line made up of valves and piping for switching the destination to which the heat stored in the thermal storage device is supplied, between the evaporator and the feed water heater depending on the status of collected heat in the heat collector.

(3) There is provided an auxiliary boiler optimum steam flow rate calculation circuit that determines the amount of the steam generated by an auxiliary boiler in a manner maximizing the efficiency of the steam turbine, in accordance with the steam pressure and flow rate that can be retrieved depending on the status of collected or stored heat.

(4) There is provided an auxiliary boiler optimum steam flow rate calculation circuit that determines the amount of the steam generated by the auxiliary boiler in a manner maximizing the efficiency of the steam turbine, in accordance with the steam pressure and flow rate that can be retrieved depending on the status of collected or stored heat and with the demand for electric power.

(5) There is provided an auxiliary boiler optimum steam flow rate calculation circuit that determines the amount of the steam generated by the auxiliary boiler in a manner maximizing the efficiency of the steam turbine, in accordance with the steam pressure that can be retrieved depending on the status of collected or stored heat and with setting pressure.

Since the above-outlined means (1) through (3) are used to switch the destination of heat utilization in accordance with the status of collected or stored heat, heat can be used efficiently in a hitherto-unusable operating range. This improves the stability in operation and the thermal efficiency of the system.

Since the above-outlined means (3) through (5) are used to provide operation control in a manner maximizing the operating efficiency of the steam turbine in keeping with the status of collected or stored heat and with the fluctuations in the demand for electric power, the thermal efficiency of the system is improved.

(Comparative examples of the solar heat steam cycle system and their problems)

To compare with the present invention, some comparative examples of the solar heat steam cycle system are explained below.

Figure 6:
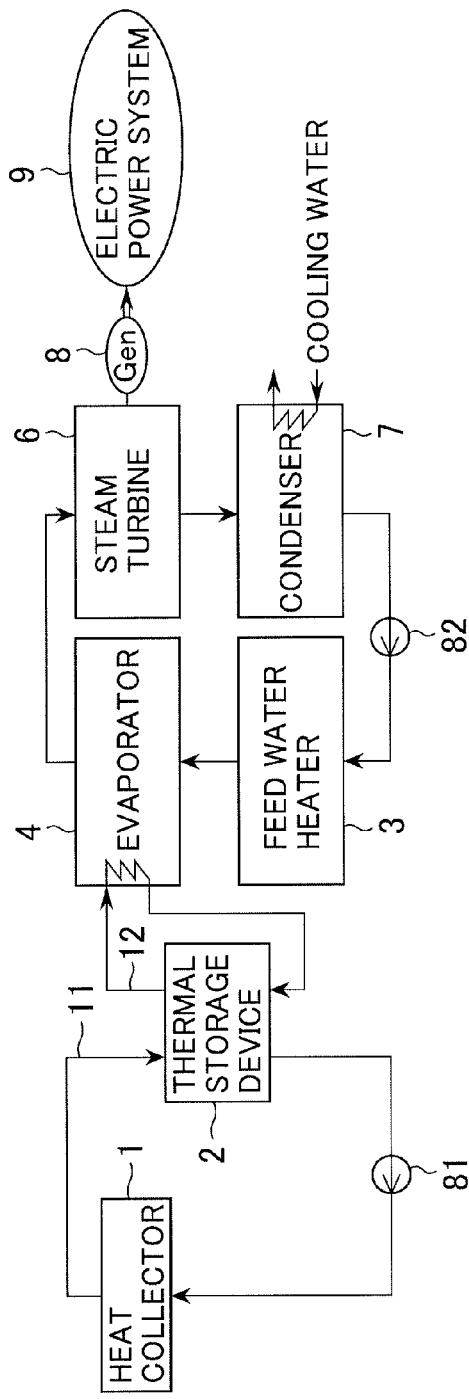
FIG. 6 is a configuration diagram of a solar heat steam cycle system as a first comparative example.

FIG. 6 shows a configuration example of the solar heat steam cycle system as the first comparative example. This system includes as its basic components a heat collector 1 that collects solar thermal energy, a thermal storage device 2 that stores the solar thermal energy collected by the heat collector 1, a feed water heater 3 that heats feed water, an evaporator 4 that evaporates the feed water supplied from the feed water heater 3, a steam turbine 6 driven by steam generated by the evaporator 4, and a condenser 7 that cools and condenses into water the steam discharged from the steam turbine 6. A heating medium retaining the solar thermal energy collected by the heat collector 1 is transported through a piping route 11 to the thermal storage device 2 so that heat is stored into the storage device 2. The heat stored in the thermal storage device 2 is transported using another heating medium through a piping route 12 to the evaporator 4 for heat being supplied to the evaporator 4. In this manner, solar thermal energy is utilized effectively in a steam cycle that includes the steam turbine 6.

Figure 7:
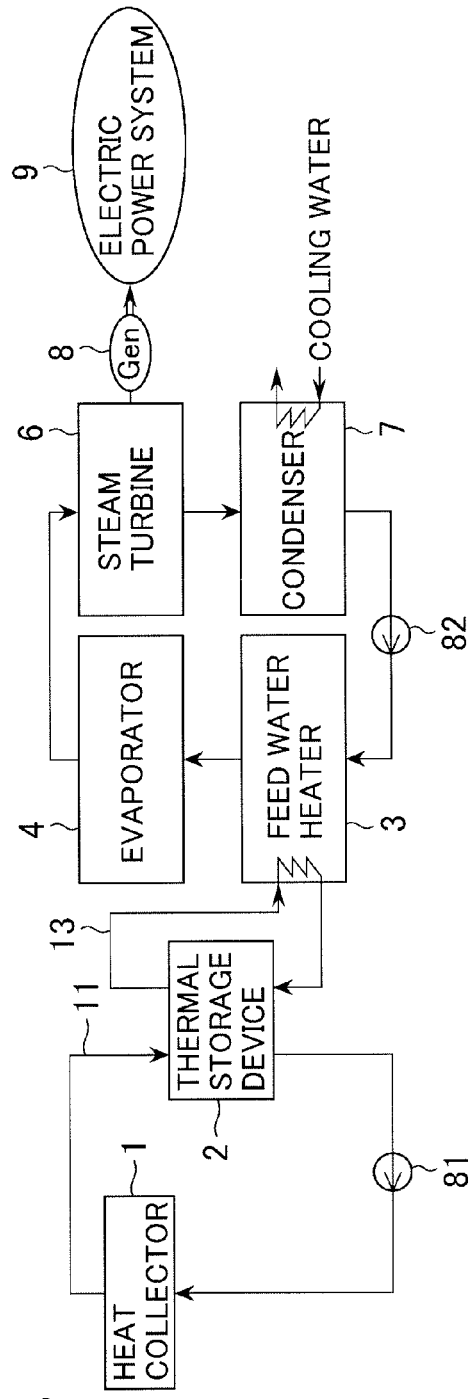
FIG. 7 is a configuration diagram of a solar heat steam cycle system as a second comparative example.

FIG. 7 shows another configuration example of the solar heat steam cycle system as the second comparative example.

As its basic components, this system also has the heat collector 1, thermal storage device 2, feed water heater 3, evaporator 4, steam turbine 6, and condenser 7 that are the same as in FIG. 6. What is different is that the heat stored in the thermal storage device 2 is not transported using a heating medium through the piping path 12 to the evaporator 4 for heat being supplied to the evaporator 4 as shown in FIG. 6 but that the stored heat is transported using the heating medium through a piping route 13 to the feed water heater 3 for heat being supplied to the feed water heater 3.

These comparative examples are effective in getting the thermal storage device 2 to absorb temporal variations in the amount of collected heat in the thermal storage device 1. However, there still remain problems in terms of how to operate the system efficiently in keeping the status of stored heat in the thermal storage device 2. For example, with the first comparative example of FIG. 6, if the stored heat amount in the thermal storage device 2 is relatively small and if the temperature of a heat storage medium is lower than the temperature necessary for the evaporator 4 to generate steam, then the heat stored in the thermal storage device 2 cannot be utilized effectively in the steam cycle side composed of the feed water heater 3, evaporator 4, and steam turbine 6. Also, with the second comparative example of FIG. 7, even if the stored heat amount in the thermal storage device 2 is relatively large and even if the temperature of the heat storage medium is higher than the temperature necessary for the evaporator 4 to generate steam, the stored heat can only be used to heat low-temperature feed water in the feed water heater 3; the stored heat cannot be utilized effectively in a higher temperature range in accordance with the stored heat amount.

(First Embodiment)

FIG. 1 shows a solar heat steam cycle system as a first embodiment of the present invention. As with the above-described comparative examples (FIGS. 6 and 7), this system has a heat collector 1, a thermal storage device 2, a feed water heater 3, an evaporator 4, a steam turbine 6, a condenser 7, a piping route 12 through which to transport a heating medium for the evaporator 4 to utilize the heat stored in the thermal storage device 2, and a piping route 13 through which to transport the heating medium for the feed water heater 3 to utilize the heat stored in the thermal storage device 2. In addition to these components, the system has a flow control valve 31 that controls the flow rate allocations of the heating medium transferred from the thermal storage device 2 to the evaporator 4 through the piping route 12 and from the thermal storage device 2 to the feed water heater 3 through the piping route 13, a valve 32 that switches or merges the flows of the heating medium returns from the evaporator 4 and feed water heater 3 to the thermal storage device 2, stored heat amount acquiring means 20 that measures or estimates the temperature or the gross heating value of the heat stored in the thermal storage device 2 (called the stored heat amount hereunder), and a control device 100. The control device 100 receives as input the stored heat amount information acquired by the stored heat amount acquiring means 20 and determines the opening of the flow control valves 31 and 32 in such a manner that the flow rate allocation of the heating medium through the heat using piping 12 toward the evaporator is relatively increased if the stored heat amount is larger than a predetermined criterion and that the flow rate allocation of the heating medium through the heat using piping 13 toward the feed water heater is relatively increased if the stored heat amount is smaller than the predetermined criterion.

In this system, if the criterion for evaluating the stored heat amount in the thermal storage device 2 (i.e., stored heat amount measured, calculated, or estimated by the stored heat amount acquiring means 20) is "whether the temperature of the heat storage medium is higher than the temperature necessary for the evaporator 4 to generate steam" and if that criterion is met, then the use of heat by the evaporator 4 is relatively increased so that the heat stored at higher temperatures can be utilized efficiently for high-temperature purposes. On the other hand, if the criterion is not met, then the valves 31 and 32 may be switched to cut off the supply of heat to the evaporator 4 and to allocate the entire heat for use by the feed water heater 3, for example. This allows the heat stored even at lower temperatures to be utilized effectively. In this manner, depending on the amount of the heat stored in the thermal storage device 2, the allocations of heat can be changed between high-temperature and low-temperature purposes at the destination of heat utilization (the temperature used by the evaporator 4 is higher than that used by the feed water heater 3). This makes it possible for the steam cycle side made of the feed water heater 3, evaporator 4 and steam turbine 6 to utilize heat more efficiently depending on the status of stored heat.

Furthermore, there may be established a second criterion of "whether the temperature of the heat storage medium is higher than the temperature for the feed water heater 3 to heat feed water." The control device 100 may be structured to include a calculation circuit addressing heat utilization by the feed water heater. The calculation circuit determines an opening command value for the valve 32 to supply heat to the feed water heater 3 if that criterion is met, the calculation circuit further generating a full-close command for the valves 31 and 32 not to supply heat to the feed water heater 3 if the criterion is not met. In this structure, as long as the second criterion is not met, heat is continuously stored into the thermal storage device 2 so that the entire system can be operated to keep the steam cycle side made of the feed water heater 3, evaporator 4, and steam turbine 6 from dropping in efficiency. (If the system is operated without the second criterion in effect and if heat is getting stored in a state corresponding to the putative second criterion not being met, the feed water heater 3 would be supplied with a low-temperature heating medium to decrease the feed water temperature, causing the steam cycle side to decline in efficiency.)

Meanwhile, the stored heat amount to be acquired by the stored heat amount acquiring means 20 may be estimated, for example, using a calculation formula $Q=(T-T0) \times M \times Cp$, where T stands for the temperature of the heat storage medium acquired by a temperature sensor (not shown) attached to the thermal storage device 2, M for the mass of the heat storage medium, and Cp for the specific heat of the heat storage medium (the temperature T0 is the reference temperature for thermal calculations). Alternatively, where the mass of the heat storage medium is close to a constant value, the temperature T of the heat storage medium substantially represents the level of the stored heating value. In such cases, the stored heat amount can be represented indirectly by T-T0. Also, where the levels of inflow and outflow energy of the thermal storage device are measured, the stored heat amount can be estimated by integrating the differences over time between the levels of the inflow and the outflow energy. In this manner, the stored heat amount acquiring means 20 need only be arranged to constitute a calculation circuit which receives as input the measured value of the heat storage medium temperature in the thermal storage device 2 or the estimated value of related information; which calculates quantitatively the amount of the heat stored in the heat storage medium using the above-mentioned calculation formula or the like; and which outputs the stored heat amount thus calculated.

Also, mechanically calculating method of classification of given the above-mentioned criteria for evaluating the stored heat amount in the thermal storage device 2 (e.g., "whether the temperature of the heat storage medium is higher than the temperature necessary for the evaporator 4 to generate steam," and "whether the temperature of the heat storage medium is higher than the temperature necessary for the feed water heater 3 to heat feed water") may involve receiving as input the target temperature to be heated (steam temperature in the case of the evaporator 4, or the feed water temperature or the target temperature to be heated of feed water in the case of the feed water heater 3) and the temperature acquired by the stored heat amount acquiring means 20 (or the temperature calculated using the above-described calculation formula (e.g., $Q=(T-T0) \times M \times Cp$) or the like based on the heating value acquired by the stored heat amount acquiring means 20), and making comparisons in magnitude between the input temperatures for evaluation.

Also, the above-described control device 100 is implemented specifically as a control panel furnished with input and output terminals and internal circuits. The stored heat amount acquired by the stored heat amount acquiring means 20 constitutes an input signal to the control panel. Using its predetermined calculation formulas, an internal calculation circuit built in the control panel performs mechanical calculations to determine whether the stored heat amount in question meets the above-described criteria for stored heat amount evaluation, and to determine the flow rate allocations to the piping routes 12 and 13 or the switch therebetween in keeping with the result of the determination. Ultimately, the control panel outputs signals in the form of the opening commands or open/close commands (including the switching command) to the flow rate control valves 31 and 32. The predetermined calculation formulas of the internal calculation circuit need only be arranged to determine the opening of the valves 31 and 32 in such a manner that if the result of the determination meets the above-mentioned first criterion for stored heat amount, "whether the temperature of the heat storage medium is higher than the temperature necessary for the evaporator 4 to generate steam," the flow rate allocation of the heating medium to the heat using piping 12 for the evaporator is relatively increased and that if the result of the determination does not meet the first criterion, the flow rate allocation of the heating medium to the heat using piping 13 for the feed water heater is relatively increased. Alternatively, the predetermined calculation formulas may be arranged so as to open the valves 31 and 32 to supply heat to the feed water heater 3 if the result of the determination meets the above-mentioned second criterion "whether the temperature of the heat storage medium is higher than the temperature necessary for the feed water heater 3 to heat feed water," and to fully close the valves 31 and 32 to cut off the supply of heat if the result of the determination does not meet the second criterion.

Also, the condenser 7 of this system may preferably be furnished with cooling means for heat exchange purposes that condenses inflow steam by circulating the deep ocean water collected through piping from a depth of at least about 200 meters in the ocean. In this case, the efficiency of the entire system can be further enhanced. That is because the temperature of the deep ocean water is generally 10° C. or lower, i.e., lower than the temperature of sea water or the like usually used as cooling water, which increases the degree of vacuum in the condenser, raises the heat drop of the steam turbine, and improves the effect of sucking the steam discharged from a low-pressure stage of the steam turbine into the condenser thereby boosting the efficiency and output of the steam turbine. Where the system is configured in this manner, the temperature difference between the sun, the highest-temperature natural heat source, and the deep ocean water, the lowest-temperature natural heat source, may be utilized in the surrounding environment. This makes it possible to acquire retrievable energy efficiently from the surrounding natural environment in keeping with the location environment.

Although the explanation above of FIG. 1 has been made using a condensing turbine system including the condenser 7 as an example, it is also possible to constitute the entire system as a backpressure turbine system that does not include a condenser. What makes the latter case different from the case of FIG. 1 is that without the condenser 7, the steam discharged from the steam turbine 6 is either appropriated for heat utilization or other purposes or released into the air; that the feed water to the feed water heater 3 is not circulated from the condenser 7 but is supplied through an independent feed water line, and that the condensing turbine as the steam turbine 6 may be replaced with a backpressure turbine. However, the availability of efficient heat utilization remains unchanged when the destination of heat use is switched between the evaporator and the feed water heater depending on the status of stored heat.

(Second Embodiment)

Figure 2:
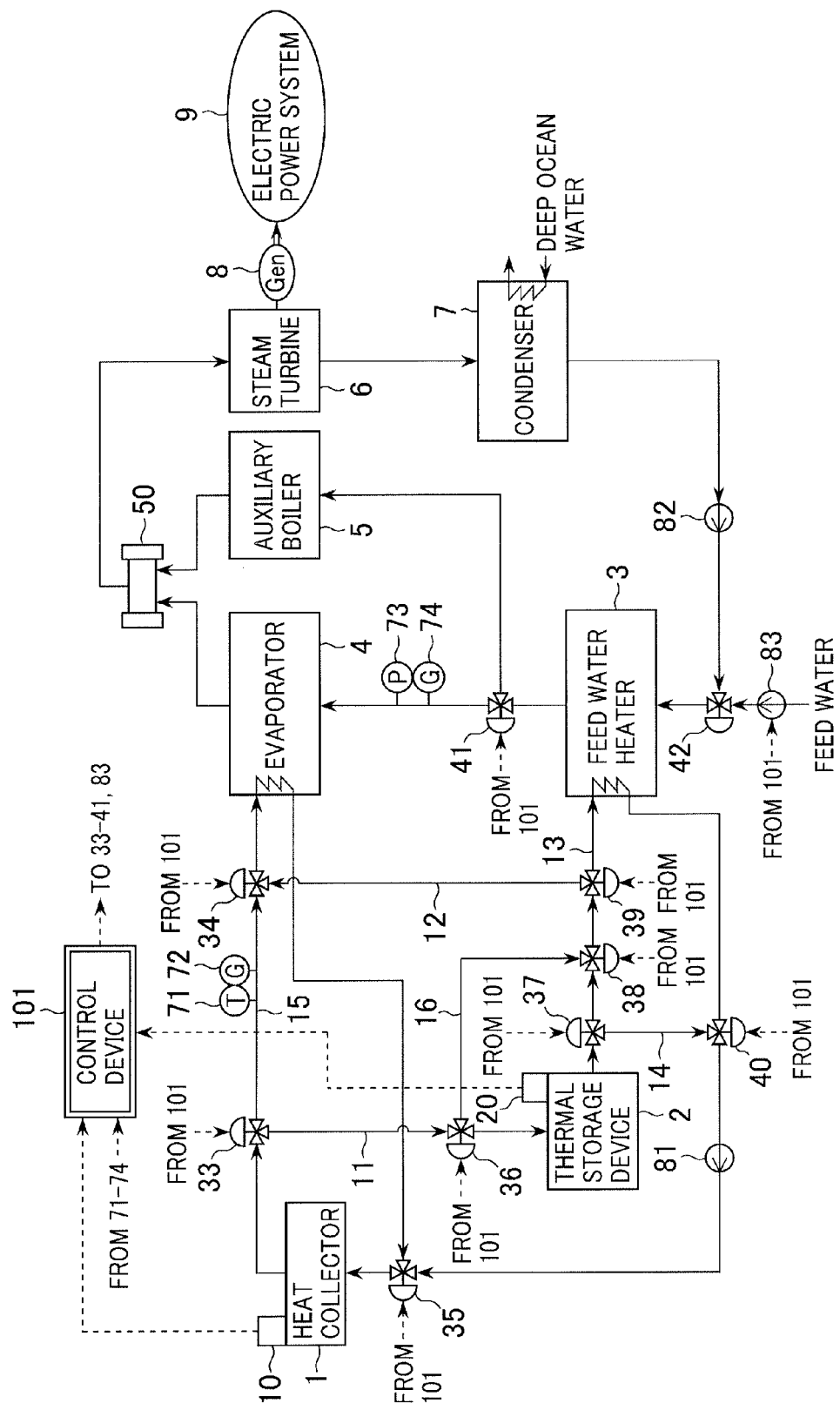
FIG. 2 is a configuration diagram of a solar heat steam cycle system as another embodiment of the present invention.

FIG. 2 shows a solar heat steam cycle system as a second embodiment of the present invention. As with the above-described comparative examples (FIGS. 6 and 7), this system has a heat collector 1, a thermal storage device 2, a feed water heater 3, an evaporator 4, a steam turbine 6, a piping route 11 through which to transfer a heating medium from the heat collector 1 to the thermal storage device 2 (in FIG. 2, the route from the heat collector 1 to the thermal storage device 2 by way of valves 33 and 36), a piping route 12 through which to transport the heating medium for the evaporator 4 to utilize the heat stored in the thermal storage device 2 (in FIG. 2, the route from the thermal storage device 2 to the evaporator 4 by way of valves 37, 38, 39 and 34), and a piping route 13 through which to transport the heating medium for the feed water heater 3 to utilize the heat stored in the thermal storage device 2 (in FIG. 2, the route from the thermal storage device 2 to the feed water heater 3 by way of the valves 37, 38 and 39). In addition to these components, the system has a piping route 15 through which to transfer the heating medium from the heat collector 1 to the evaporator 4 (in FIG. 2, the route from the heat collector 1 to the evaporator 4 by way of the valves 33 and 34), a piping route 16 through which to transfer the heating medium from the heat collector 1 to the feed water heater 3 (in FIG. 2, the route from the heat collector 1 to the feed water heater 3 by way of the valves 33, 36, 38 and 39), and a piping route 14 through which to return the flow of the heating medium supplied from the heat collector 1 or thermal storage device 2 while bypassing the feed water heater 3 (in FIG. 2, the flow from the heat collector 1 to a pump 81 by way of the valves 33, 36, 38, 37 and 40; or from the thermal storage device 2 to the pump 81 by way of the valves 37 and 40). The system further has a flow rate control valve 39 that switches the flow rate allocations of the heating medium transferred from the thermal storage device 2 to the evaporator 4 through the piping route 12 and from the thermal storage device 2 to the feed water heater 3 through the piping route 13, a valve 35 that switches or merges the flows of the heating medium returned from the evaporator 4 and feed water heater 3 to the heat collector 1, a flow rate control valve 33 that changes the flow rate allocations of the heating medium transferred from the heat collector 1 to the thermal storage device 2 through the piping route 11 and from the heat collector 1 to the evaporator through the piping route 15, and a valve 34 that switches or merges the flows of the heating medium from the heat collector 1 to the evaporator 4 through the piping route 15 and from the thermal storage device 2 to the evaporator 4 through the piping route 12. The system further has a flow rate control valve 36 that changes the flow rate allocations of the heating medium transferred from the heat collector 1 to the thermal storage device 2 through the piping route 11 (especially through a route portion from the valve 36 to the thermal storage device 2) and from the heat collector 1 to the feed water heater 3 through a piping route 17 (no reference numeral given in FIG. 2; the route from the valve 33 to the feed water heater 3 by way of the valves 36, 38 and 39, especially the route downstream of the valve 36 here), a flow rate control valve 38 that changes the flow rate allocations of the heating medium transferred from the heat collector 1 to the feed water heater 3 through the piping route 17 (especially the route from the valve 38 to the feed water heater 3 by way of the valve 39) and through the piping route 14 that bypasses the supply of heat from the heat collector 1 to the feed water heater 3 (especially the flow from the valve 38 to the pump 81 by way of the valves 37 and 40), and a flow rate control valve 37 that changes the flow rate allocations of the heating medium transferred from the thermal storage device 2 to the feed water heater 3 through the piping route 13 as well as through the piping route 14 that bypasses the supply of heat to the feed water heater 3 (especially the flow from the valve 37 to the pump 81 by way of the valve 40). The system further has a valve 40 that switches or merges the flows of the heating medium returned from the thermal storage device 2 and feed water heater 3 to the heat collector 1, collected heat amount acquiring means 10 that measures or estimates the temperature or the gross heating value of the heat collected by the heat collector 1 (called the collected heat amount hereunder), stored heat amount acquiring means 20 that measures or estimates the temperature or the gross heating value of the heat stored in the thermal storage device 2 (called the stored heat amount hereunder), and a control device 100 that controls the valves 33 through 41 and a feed water pump 83.

The control device 100 receives information about the collected heat amount acquired by the collected heat amount acquiring means 10 or about the stored heat amount acquired by the stored heat amount acquiring means 20 (called the retrievable heating value hereunder appropriately) as input, (i) determines opening command values for the flow rate control valve 33 in such a manner that if the collected heat amount is larger than a predetermined criterion, the flow rate from the heat collector 1 to the evaporator 4 through the piping route 15 will become higher than the flow rate from the heat collector 1 to the feed water heater 3 through the piping route 16 (the command values include those for full-close/full-open switching of the two routes) and (ii) determines opening command values for the flow rate control valve 33 in such a manner that if the collected heat amount is smaller than the predetermined criterion, the flow rate from the heat collector 1 to the evaporator 4 through the piping route 15 will become lower than the flow rate from the heat collector 1 to the feed water heater 3 through the piping route 16 (the opening command values include those for switching the two routes). Alternatively, the control device 100 (i) determines opening command values for the flow rate control valve 39 in such a manner that if the stored heat amount is larger than a predetermined criterion, the flow rate from the thermal storage device 2 to the evaporator 4 through the piping route 12 will become higher than the flow rate from the thermal storage device 2 to the feed water heater 3 through the piping route 13 (the command values include those for switching the two routes) and (ii) determines opening command values for the flow rate control valve 39 in such a manner that if the stored heat amount is smaller than the predetermined criterion, the flow rate from the thermal storage device 2 to the evaporator 4 through the piping route 12 will become lower than the flow rate from the thermal storage device 2 to the feed water heater 3 (the opening command values include those for switching the two routes).

This system, as with the above-described example of FIG. 1, can change the allocations of heat between high-temperature and low-temperature purposes at the destination of heat use (the temperature for use by the evaporator 4 is higher than the temperature used by the feed water heater 3) in accordance with the criterion for evaluating the heating value stored in the thermal storage device 2. This makes it possible to effectively utilize heat on the steam cycle side (i.e., the line made up of the feed water heater 3, evaporator 4, and steam turbine 6) in a more efficient manner in keeping with the status of stored heat. The same also applies to the configuration and the advantages in effect where the second evaluation criterion is used which was discussed in conjunction with the example of FIG. 1.

What makes this system different from the example in FIG. 1 is that the allocations of the heat collected by the heat collector 1 for being supplied to and being used by, the evaporator 4, feed water heater 3, or thermal storage device 2 can be adjusted through the combination of the valves 33 and 36. That is, the valve 33 can adjust how much heat is to be allocated to the evaporator 4 for use thereby, and the valve 36 can adjust how much of the remaining heat not allocated to the evaporator 4 is to be allocated to the feed water heater 3 and to the thermal storage device 2. Thus if the above-mentioned criterion for evaluating the heating value collected by the heat collector 1 is "whether the temperature of the heating medium heated by the heat collector 1 and fed to the valve 33 is higher than the temperature necessary for the evaporator 4 to generate steam," for example, and if that criterion is met, the use of heat by the evaporator 4 is relatively increased so that the heat collected at high temperatures may be utilized for high-temperature purposes. If the criterion is not met, on the other hand, the use of heat by the feed water heater 3 is relatively increased or the entire heat is appropriated for use by the feed water heater 3 (by cutting off the heat to the evaporator 4) so that the heat collected at low temperatures may still be utilized effectively and that the remaining heat may be stored in the thermal storage device 2. In this manner, depending on the magnitude of the heating value collected by the heat collector 1, it is possible to change the allocations of heat between high-temperatures and low-temperature at the destination of heat utilization (the temperature used by the evaporator 4 is higher than the temperature for use by the feed water heater 3). This makes it possible to effectively utilize heat on the steam cycle side (i.e., the line made up of the feed water heater 3, evaporator 4, and steam turbine 6) in a more efficient manner in accordance with the status of stored heat.

Also, if the second criterion for evaluating the heating value collected by the heat collector 1 (i.e., the heating value measured, calculated, or estimated by the collected heat amount acquiring means 10) is "whether the temperature of the heating medium heated by the heat collector 1 and supplied via the valve 33 is higher than the temperature necessary for the feed water heater 3 to heat feed water," the control device 101 may also include a calculation circuit that is related to the heat utilization to the feed water heater and that determines the valve opening command values depending on the flow rate allocations to the thermal storage device 2 and to the feed water heater 3 via the valve 36 in such a manner that if the evaluation criterion above is met, the heat is supplied to the feed water heater 3 and that if the criterion is not met, the heat is not supplied to the feed water heater 3. In this manner, where the collected heat amount does not meet the second evaluation criterion, the heat is continuously stored into the thermal storage device 2. The entire system can then operate without dropping in efficiency on the steam cycle side composed of the feed water heater 3, evaporator 4, and steam turbine 6. (If operation is made without practice of the second evaluation criterion and if the criterion is not met in view of the status of collected heat, a low-temperature heating medium would be supplied to the feed water heater 3 that in turn would lower the temperature of its feed water, reducing the efficiency of the steam cycle side.)

In another example of the control device having the above-mentioned second criterion for evaluating the collected heat amount, the control device 101 may be structured to include a calculation circuit which, given a low amount of collected heat, generates open/close commands (including opening commands) in such a manner that if the second evaluation criterion is not met, the route to the evaporator 4 will be closed by the valve 33, the route to the thermal storage device 2 will be closed by the valve 36, the route to the feed water heater 3 will be closed by the valve 38, and the route for return flow to the heat collector 1 will be opened by the valve 37. In this case, if the collected heat amount does not meet the second evaluation criterion, low-temperature heat collected by the heat collector can be returned to the heat collector 1 while bypassing all of the evaporator 4, feed water heater 3, and thermal storage device 2. This, given a low amount of collected heat upon start-up or in case of bad weather, allows the system to operate in a manner preventing the feed water or the steam in the steam cycle line (made up of the feed water heater 3, evaporator 4, and steam turbine 6) from getting cooled causing the line to drop in efficiency.

Meanwhile, the collected heat amount acquired by the collected heat amount acquiring means 10 may be estimated, for example, using a calculation formula $q=(T-T0) \times G \times Cp$, where T stands for the temperature of the heating medium flowing through the heat collector, the temperature being acquired by a temperature sensor (not shown) attached to the heat collector 1; G for the flow rate of the heating medium acquired by a flow rate sensor attached to the piping leading to or emanating from the heat collector 1, and Cp for the specific heat of the heating medium (the temperature T0 is the reference temperature for thermal calculations). Alternatively, since the temperature T of the heating medium denotes the quality of the heat available by use of temperature difference, the heating value can be represented indirectly by T-T0. Also, where the levels of energy of fluid flow in to and flow out from the heat collector are being measured, the collected heat amount can be estimated by integrating the differences over time between the quantities of the inflow and the outflow energy. In this manner, the collected heat amount acquiring means 10 need only be arranged to constitute a calculation circuit which receives as input the measured or estimated value of the temperature of the heating medium flowing through the heat collector 1; which calculates quantitatively the amount of the heat collected by the heat collector using the above-mentioned calculation formula or the like, and which outputs the collected heat amount thus calculated.

Also, given the above-mentioned criteria for evaluating the collected heat amount in the heat collector 1 (e.g., "whether the temperature of the heating medium is higher than the temperature necessary for the evaporator 4 to generate steam," and "whether the temperature of the heating medium is higher than the temperature necessary for the feed water heater 3 to heat feed water"), the method of mechanically calculating the classification of each criterion may involve receiving as input the target temperature to be heated (steam temperature in the case of the evaporator 4, or the feed water temperature or the target temperature to be reached of feed water in the case of the feed water heater 3) and the temperature acquired by the collected heat amount acquiring means 10 (or the temperature calculated using the above-described calculation formula (e.g., $q=(T-T0) \times M \times Cp$) or the like based on the heating value or an indicator value of heat quality acquired by the collected heat amount acquiring means 10), and making comparisons in magnitude between the input temperatures for evaluation.

Also, the method of measuring, calculating, or estimating the stored heat amount in the stored heat amount acquiring means 20 and the criteria for evaluating the stored heat amount are the same as those discussed above in reference to FIG. 1.

Also, the above-described control device 101 is implemented specifically as a control panel furnished with input and output terminals and internal circuits. At least either the collected heat amount acquired by the collected heat amount acquiring means 10 or the stored heat amount acquired by the stored heat amount acquiring means 20 (called the available heating value hereunder) constitutes an input signal to the control panel. Using its predetermined calculation formulas, an internal calculation circuit built in the control panel performs mechanical calculations to determine whether the available heat amount meets the above-described evaluation criteria, and carries out valve opening commands (including open/close switching commands and a command for returning the heating medium to the heat collector 1 by bypassing all other components involved) depend on the flow rate allocations to the evaporator 4, feed water heater 3, and thermal storage device 2 in keeping with the result of the determination. Ultimately, the control panel outputs signals in the form of the opening commands or open/close commands (including the switching command) to the valves 33, 36, 38 and 37. The predetermined calculation formulas of the internal calculation circuit need only be arranged to determine such opening command values or open/close command values for the above-mentioned valves in accordance with the result of the determination on the collected or stored heat amount, as discussed above in connection with the control device 101 in the system configuration. Alternatively, the predetermined calculation formulas may be arranged to determine the opening of the valves involved in such a manner that if the result of the determination meets the above-mentioned second criterion "whether the temperature of the heat storage medium is higher than the temperature necessary for the feed water heater 3 to heat feed water," heat is supplied to the feed water heater 3 via the route passing through the valves 37 and 38, and that if the result of the determination does not meet the second criterion, the heating medium is returned via the route passing through the valves 37, 40 and 35, in that order, to cut off the supply of heat to the feed water heater 3. In like manner, the predetermined calculation formulas may be arranged to determine the opening of the valves involved in such a manner that if the result of the determination meets the another example of the above-mentioned second criterion, "whether the temperature of the heating medium heated by the heat collector 1 is higher than the temperature necessary for the feed water heater 3 to heat feed water," heat is supplied to the feed water heater 3 via the route passing through the valves 33, 36 and 38, and that if the result of the determination does not meet the another example of the second criterion, the heating medium is returned via the route passing through the valves 33, 36, 38, 37 and 40, in that order, to cut off the supply of heat to the feed water heater 3.

What characterizes this example (FIG. 2) in distinction from the example of FIG. 1 is the ability to deal with short variations in a time scale. The reason for this is that since the amount of the heat collected by the heat collector 1 (i.e., collected heat amount acquired by the collected heat amount acquiring means 10) is subject to larger variations over time than the amount of the heat stored in the thermal storage device 2 (stored heat amount acquired by the stored heat amount acquiring means 20), the destination of heat supply is allowed to be switched between the evaporator 4, the feed water heater 3 and the thermal storage device 2 depending on the status of collected heat (on the temperature or the heating value in particular) so that the collected heat amount varying with solar radiation status may be utilized exhaustively with little loss. In this manner, this system controls the distribution of the heat collected by the heat collector 1 to the evaporator 4, feed water heater 3, and thermal storage device 2 without the intervention of the thermal storage device 2 therebetween. The system is thus effectively usable when the thermal storage device 2 is being stopped for maintenance or due to a failure or when the heating value exceeding the capacity of the thermal storage device 2 is being collected by the heat collector 2.

The system capable of controlling the distribution of the heat collected by the heat collector 1 to the evaporator 4, feed water heater 3, and thermal storage device 2 without the thermal storage device 2 intervening therebetween is also effective where the thermal storage device 2 cannot be installed due to site area restrictions or other constraints. In such a case, the system can be configured by removing from the components in FIG. 2 the thermal storage device 2, the stored heat amount acquiring means 20, and the valves 36 and 37 for adjusting the input and output of heat to and from the thermal storage device 2.

Meanwhile, if a condenser 7 utilizes the deep ocean water or the like as its cooling water for condensing steam in the manner discussed above in reference to FIG. 2, the efficiency of the entire system can be further enhanced. Likewise, it is possible to remove the condenser 7 from the system configuration so that the steam turbine 6 is constituted not as a condensing turbine but as a backpressure turbine. In this case, there can also be such advantages as the ability to deal with shorter variations in a time scale and to let the system operate flexibly when the thermal storage device is maintained or has broken down or when the stored heat amount is being in excess.

(Third Embodiment)

Figure 3:
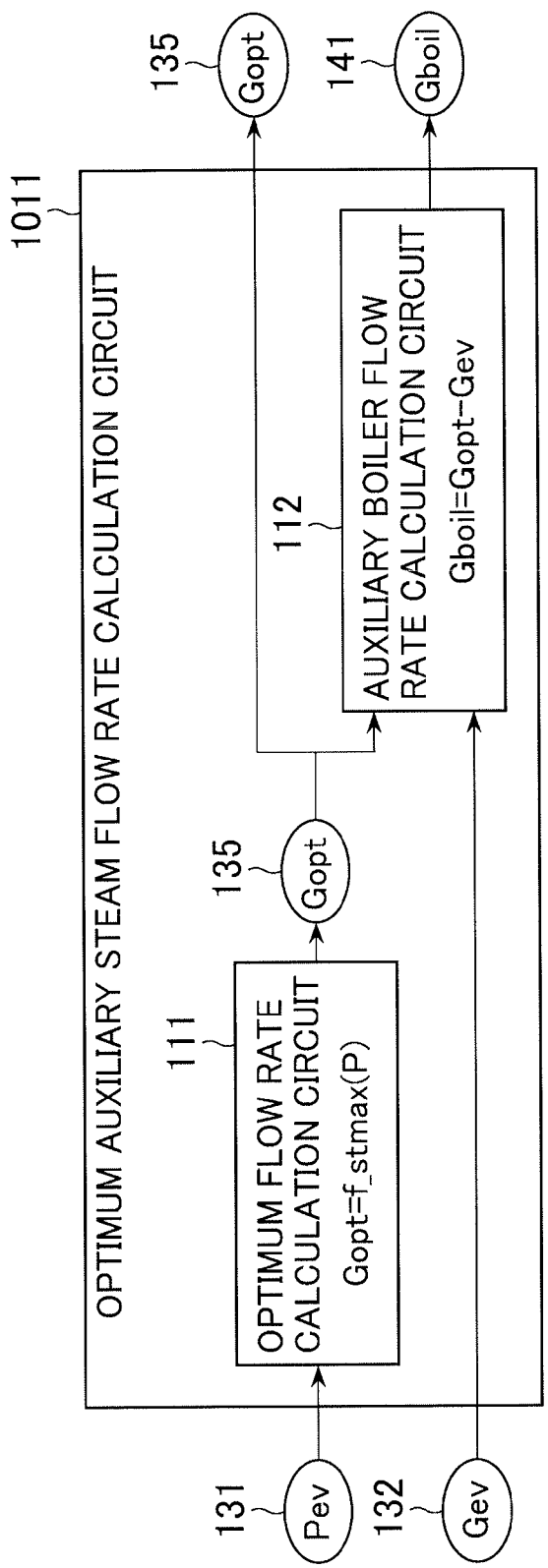
FIG. 3 shows an example of a typical calculation circuit in the control device indicated in FIG. 2.
Figure 4:
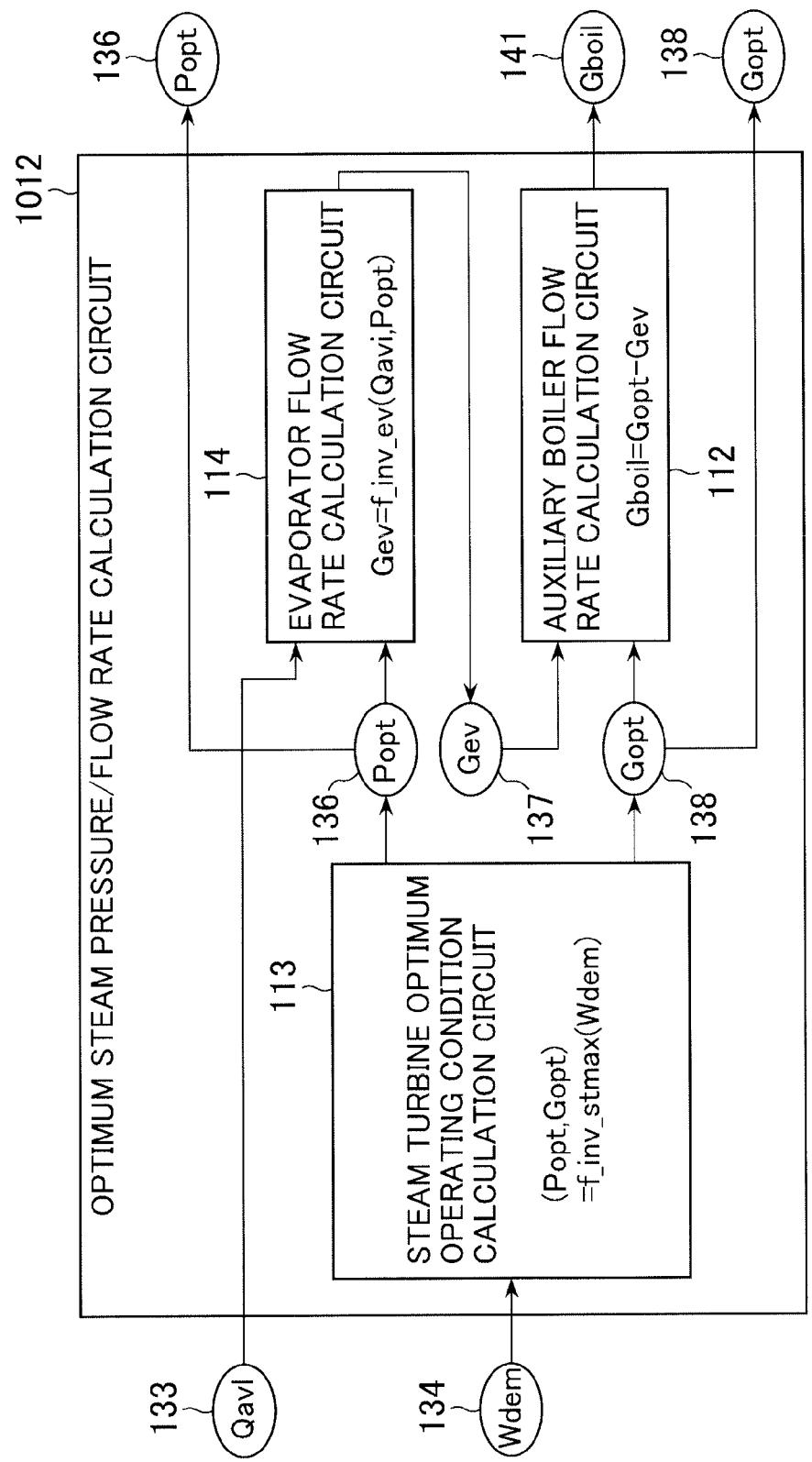
FIG. 4 shows an example of another typical calculation circuit in the control device indicated in FIG. 2.
Figure 5:
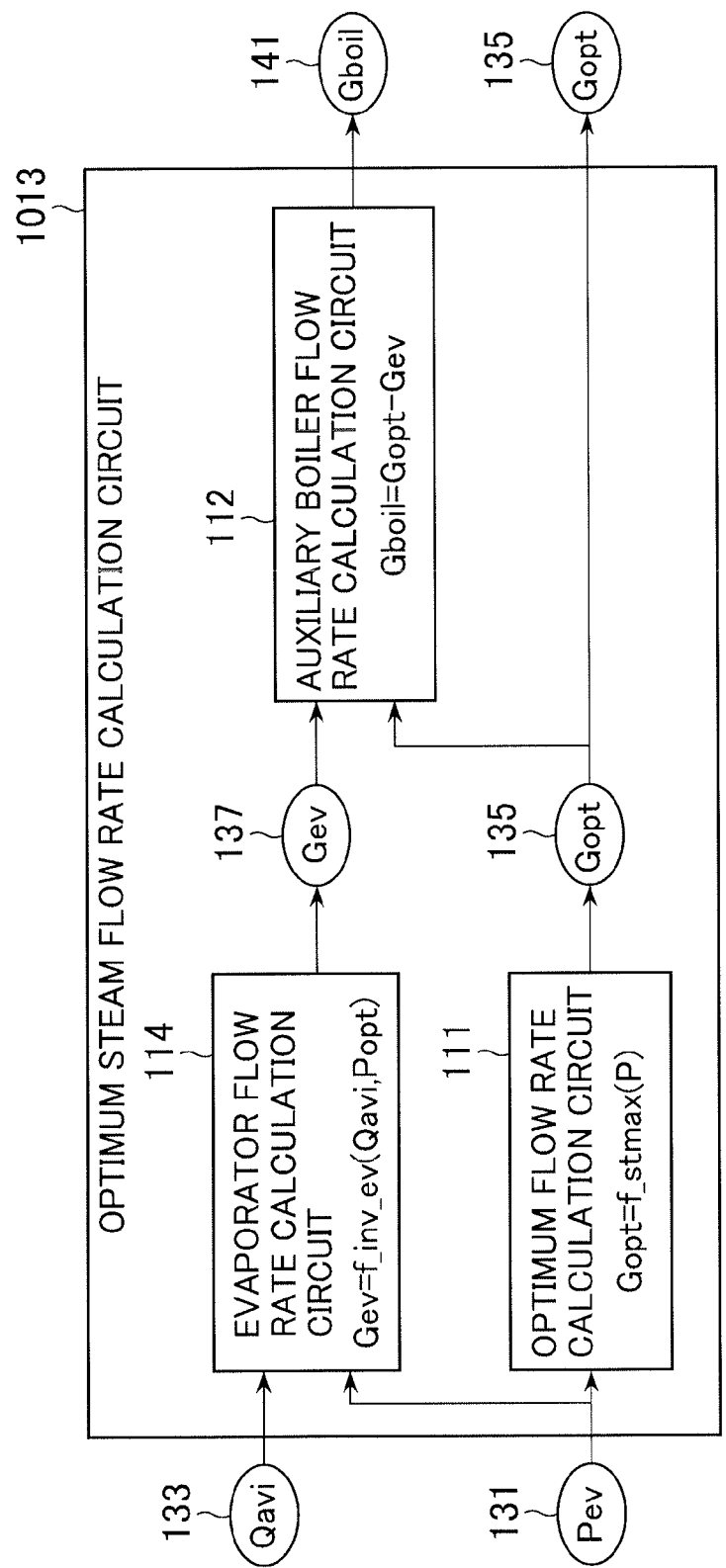
FIG. 5 shows an example of a further typical calculation circuit in the control device indicated in FIG. 2.

FIGS. 3, 4 and 5 show examples of the method of control for more efficient operation in consideration of the device characteristics of the steam cycle. These examples are aimed at solving the problem of the solar heat steam cycle system, that is, the problem of the inability to maximize steam turbine efficiency continuously because of the variations in steam pressure caused by the changes in the amount of solar radiation. (Incidentally, steam pressure is varied because solar radiation changes since the temperature of the heating medium collected by the heat collector 1 or stored in the thermal storage device 2 and because the temperature of the steam obtained through heat exchange between the heating medium and the evaporator 4 cannot exceed the temperature of the heating medium. For example, when the temperature of the heating medium is low in time zones such as in the early morning or at night, in which the amount of solar radiation is low, the steam temperature is also low compared with during the day.)

Whereas the system configuration as the precondition is the same as in FIG. 2, the structures specific to the third embodiment are as follows. First, besides the components discussed in conjunction with the second embodiment, there are provided: an auxiliary boiler 5 that generates steam using a heat source or a fuel different from that of the evaporator 4; pressure acquiring means 73 and flow rate acquiring means 74 for measuring, estimating, or calculating the pressure and the flow rate of the evaporator; and temperature acquiring means 71 and flow rate acquiring means 72 for measuring, estimating, or calculating the temperature and the flow rate of the heating medium supplied from the heat collector 1 to the evaporator 4. Second, the control device 101 appropriately uses the signals acquired by the pressure acquiring means 73, flow rate acquiring means 74, temperature acquiring means 71, and flow rate acquiring means 72, as input information. FIGS. 3, 4 and 5 are each explained below.

FIG. 3 shows a calculation circuit (an optimum auxiliary steam flow rate calculation circuit 1011) furnished in the control device 101 (FIG. 2). The optimum auxiliary steam flow rate calculation circuit 1011 receives as input a steam pressure 131 (FIG. 3) acquired by the pressure acquiring means 73 (FIG. 2) and an evaporator flow rate 132 (FIG. 3) acquired by the flow rate acquiring means (flow rate of feed water or evaporation to the evaporator 4), and outputs a steam turbine optimum steam flow rate 135 (FIG. 3) and an auxiliary boiler optimum flow rate 141 (FIG. 3) (flow rate of feed water or evaporation of the auxiliary boiler 5) for maintaining the high efficiency of the steam turbine 6 (FIG. 2). The optimum auxiliary steam flow rate calculation circuit 1011 is furnished internally with an optimum flow rate calculation circuit 111 which receives the input of the above-mentioned steam pressure 131 and which calculates and outputs a steam pressure 135 for maximizing the efficiency of the steam turbine 6 (FIG. 2) based on predetermined relations, and an auxiliary boiler flow rate calculation circuit 112 which receives as input the steam turbine optimum steam flow rate 135 output from the optimum flow rate calculation circuit 111 and the above-mentioned evaporator flow rate 132 and which calculates the auxiliary boiler optimum flow rate 141 by subtracting the evaporator flow rate 132 from the steam turbine optimum flow rate 135 before outputting the calculated auxiliary boiler optimum flow rate 141 (if the difference turns out to be negative, the flow rate is assumed to be zero). The optimum flow rate calculation circuit 111 has the relations between pressures and flow rates turned into functions beforehand in the form of a numerical table or correlation equations based on the characteristics of the steam turbine 6 so that when a steam pressure is input, a steam flow rate for maximizing turbine efficiency will be output.

Explained below in reference to FIG. 2 discussed above is how the operation of the entire system is controlled using the optimum auxiliary steam flow rate calculation circuit 1011. The optimum auxiliary steam flow rate calculation circuit 1011 (FIG. 3) is incorporated in the control device 101 (FIG. 2). Inside the control device 101, the auxiliary boiler optimum flow rate 141 and steam turbine optimum steam flow rate 135 output from the optimum auxiliary steam flow rate calculation circuit 1011 are acquired. The auxiliary boiler optimum flow rate 141 thus acquired is converted to an opening command value destined for a flow rate control valve 41 that allocates the feed water flow rate (from the feed water heater 3) to the evaporator 4 and to the auxiliary boiler 5 in such a manner that the flow rate of the auxiliary boiler 5 will match the auxiliary boiler optimum flow rate 141. The conversion is carried out inside the control device 101 on the basis of predetermined flow rate-to-opening relations of the valve 41. Likewise, the acquired steam turbine optimum steam flow rate 135 is converted to a feed water command value destined for the pump 83 that feeds water to the entire steam cycle (i.e., the line made up of the feed water heater 3, evaporator 4, auxiliary boiler 5, and steam turbine 6). The opening command value thus obtained is transmitted to the flow rate control valve 41 and the feed water command value to the feed water pump 83 in the form of signals. The flow rate control valve 41 and the feed water pump 83 operate in response to the transmitted command values, thereby controlling the operation of the entire system.

For the variations in steam pressure, this system gets the optimum flow rate calculation circuit 111 to calculate an optimum steam flow rate for steam turbine efficiency and the auxiliary boiler flow rate calculation circuit 112 to determine the flow rate of the auxiliary boiler 5 in such a manner that the flow rate of the steam supplied to the steam turbine 6 (or to a merging device 50 to which the steam generated by the evaporator 4 and auxiliary boiler 5 is forwarded) will match the optimum steam flow rate. This allows the steam turbine 6 to operate with high efficiency. On this point, this system is suitable for optimum operation based on the pressure and the flow rate of the steam generated by a solar heat system.

Also, this system has the generated power output of the steam turbine 6 determined in subordination to the steam pressure 131 and flow rate 135. Thus the system is suitable for cases where operation is not available in accordance with the command values of generated power output, i.e., where power supply equipment corresponding to an electric power system 9 (FIG. 2) exists outside the plant of this system (called this plant hereunder) so that this plant need only generate a retrievable amount of power from solar heat for required demand of electric power.

Although FIG. 2 shows the feed water line to the auxiliary boiler branching from the line leading from the feed water heater 3 to the evaporator 4, the feed water line to the auxiliary boiler 5 may be structured apart from the feed water to the evaporator. In this case, an auxiliary boiler feed water flow rate control system need only be structured to operate the feed water pump flow rate to the auxiliary boiler 5 to attain the above-mentioned auxiliary boiler optimum flow rate 141 (the value calculated by the optimum auxiliary steam flow rate calculation circuit 1011). The same also applies to subsequent examples (FIGS. 4 and 5).

Also, although the inside of the optimum auxiliary steam flow rate calculation circuit 1011 is shown made up of a plurality of calculation circuits (optimum flow rate calculation circuit 111 and auxiliary boiler flow rate calculation circuit 112) in this example, this does not mean that the control circuit is structured with separate calculation chips. Instead, the structure is shown to explain the functional composition of the control device; the actual control circuit need only possess capabilities corresponding to these circuits (the same also applies to subsequent examples).

(Fourth Embodiment)

FIG. 4 shows another example of the calculation circuit (an optimum steam pressure/flow rate calculation circuit 1012) furnished in the control device 101 (FIG. 2). The optimum steam pressure/flow rate calculation circuit 1012 receives as input an available heating value 133 (FIG. 4) that exists either collected by the heat collector 1 (FIG. 2) or stored in the thermal storage device 2 (FIG. 2) and a power demand amount 134 (FIG. 4) for the electric power system 9 (FIG. 2) supplied with the electric power generated by a power generator 8 (FIG. 2) of the steam turbine 6 (FIG. 2), and outputs a steam turbine optimum pressure 136 (FIG. 4), a steam turbine optimum flow rate 138 (FIG. 4), and an auxiliary boiler optimum flow rate 141 (FIG. 4) (the flow rate of feed water or evaporation of the auxiliary boiler 5) for maintaining the high efficiency of the steam turbine 6 (FIG. 2). Specifically, the available heating value 133 is the heating value acquired by the collected heat amount acquiring means 10 (FIG. 2) or by the stored heat amount acquiring means 20 (FIG. 2), or the available heating value from the heat collector 1 and calculated based on the calculation formula $Q=(T-T0)\times Cp\times G$, where T stands for the temperature acquired by the temperature acquiring means 71 and G for the flow rate acquired by the flow rate acquiring means 72 (in the formula, the temperature T0 is the reference temperature for thermal calculations and Cp denotes a specific heat). Also, the value of the power demand amount 134 is assumed to have been acquired separately using any appropriate known method such as time series forecasting or neutral net.

Inside the optimum steam pressure/flow rate calculation circuit 1012, there are provided a steam turbine optimum operating condition calculation circuit 113 which receives the input of the above-mentioned power demand amount 134 and which determines and outputs the combination of the optimum steam pressure 136 and optimum steam flow rate 138 constituting an optimum operating condition for the steam turbine 6 (FIG. 2) to provide a power generation amount corresponding to the input power demand, i.e., an operating condition that will maximize steam turbine efficiency; an evaporator flow rate calculation circuit 114 which receives as input the optimum steam pressure 136 output from the steam turbine optimum operating condition calculation circuit 113 and the above-mentioned available heating value 133 and which estimates and outputs a steam flow rate 137 obtained when the available heating value 133 is converted by the evaporator 4 into steam of the steam pressure 136 (the steam flow rate will be called the available steam flow rate hereunder); and an auxiliary boiler flow rate calculation circuit 112 which receives as input the available steam flow rate 137 output from the evaporator flow rate calculation circuit 114 and the optimum steam flow rate 138 output from the steam turbine optimum operating condition calculation circuit 113 and which outputs an auxiliary boiler flow rate 141 obtained by subtracting the available steam flow rate 137 from the optimum steam flow rate 138 (if the difference turns out to be negative, the flow rate is assumed to be zero).

Here, the steam turbine optimum operating condition calculation circuit 113 is mounted beforehand as a calculation circuit based on the mathematical expressions and numerical tables constituting a functional relationship in which the characteristics of the power generation output W and turbine efficiency η are defined in conjunction with the steam pressure P and steam flow rate G of the steam turbine 6 (f denotes a function), the functional relationship being as follows:

$$(W, \eta) = f(P, G) \quad (1)$$

Furthermore, the steam turbine optimum operating condition calculation circuit 113 has an optimum value search function for determining the combination of a steam pressure P and a flow rate G in which the power generation output W will satisfy the power demand amount 134, i.e., the value of the power generation output required by the electric power system 9, while maximizing the turbine efficiency η. This optimum value search function can be mounted using any suitable known optimization algorithm such as Newton's method.

Also, the calculation of the evaporator flow rate calculation circuit 114 may be performed by implementing what is represented by a calculation formula $G=Q\times\eta\div(Hs-Hfw)$, where Q stands for the available heating value, P for the steam pressure, $Hs=f(P)$ for saturated steam enthalpy (f denotes a function), Hfw for feed water enthalpy, η for the efficiency of steam generation, and G for the flow rate of steam.

Explained below in reference to FIG. 2 is how the entire system operation is controlled using the optimum steam pressure/flow rate calculation circuit 1012 (optimum steam pressure/flow rate calculation circuit). The optimum steam pressure/flow rate calculation circuit 1012 (FIG. 4) is incorporated in the control device 101 (FIG. 2). Inside the control device 101, the steam turbine optimum pressure 136, steam turbine optimum steam flow rate 138, and optimum auxiliary boiler flow rate 141 are acquired as output from the optimum steam pressure/flow rate calculation circuit 1012. The steam turbine optimum pressure 136 thus acquired is used to manipulate the opening of a pressure control valve 43 (not shown in FIG. 2) in a steam cycle in such a manner that the pressure of that steam cycle (the line made up of the feed water heater 3, evaporator 4, auxiliary boiler 5, and steam turbine 6) measured by the pressure acquiring means 73 will match the steam turbine optimum pressure 136. Likewise, the acquired optimum auxiliary boiler flow rate 141 is converted to an opening command value destined for the flow rate control valve 41 for allocating the feed water flow rate (from the feed water heater 3) to the evaporator 4 and auxiliary boiler 5, in such a manner that the flow rate of the auxiliary boiler 5 will match the optimum auxiliary boiler flow rate 141. The conversion is carried out inside the control device 101 using predetermined flow rate-to-opening relations of the valve 41. In like manner, the acquired steam turbine optimum flow rate 138 is converted to a feed water command value destined for the pump 83 that feeds water to the entire steam cycle (the line made up of the feed water heater 3, evaporator 4, auxiliary boiler 5, and steam turbine 6). In this manner, the acquired optimum steam pressure value is transmitted to the pressure control valve 43 of the steam cycle, the opening command value to the flow rate control valve 41, and the feed water command value to the feed water pump 83 in the form of signals. The pressure control valve 43, flow rate control valve 41, and feed water pump 83 operate in response to these command values, thereby controlling the entire system operation.

In this system, the steam turbine optimum operating condition calculation circuit 113 calculates the steam pressure 136 and flow rate 138 that will maximize steam turbine efficiency in keeping with the fluctuations in the demand for power. The pressure of the steam cycle is controlled to meet these conditions. At the same time, the flow rate of the auxiliary boiler 5 is determined (with the auxiliary boiler flow rate calculation circuit 112) by subtracting from the optimum flow rate 138 an estimated value 137 of the amount of steam retrievable from the solar heat system, in such a manner that the flow rate of the steam supplied to the steam turbine 6 will match the optimum flow rate 138. In this manner, the system can operate the steam turbine 6 continuously with high efficiency.

In view of this point, the system is suitable for optimum system operation when two kinds of information, the available heating value from the solar heat system and the demand for power on the side of the electric power system, can be acquired. In particular, the system is suitable where the system is to run in linkage with the electric power system by receiving power generation output command values from the electric power system side, or where the electric power system 9 is required to exist isolated and independent of the outside of the target area in so-called island operation.

(Fifth Embodiment)

FIG. 5 shows another example of the calculation circuit (an optimum steam flow rate calculation circuit 1013) furnished in the control device 101. The optimum steam flow rate calculation circuit 1013 receives as input an available heating value 133 (FIG. 5) that exists either collected by the heat collector 1 (FIG. 2) or stored in the thermal storage device 2 (FIG. 2) and a steam pressure 131 (FIG. 5) acquired by the above-mentioned pressure acquiring means 73 (FIG. 2), and outputs a steam turbine optimum steam flow rate 135 (FIG. 5) and an auxiliary boiler optimum flow rate 141 (FIG. 5) (the flow rate of feed water or evaporation of the auxiliary boiler 5) for maintaining the high efficiency of the steam turbine 6 (FIG. 2).

Inside the optimum steam flow rate calculation circuit 1013, there are provided an evaporator flow rate calculation circuit 114 which receives as input the above-mentioned available heating value 133 and the steam pressure 131 and which estimates and outputs a steam flow rate 137 (called the available steam flow rate hereunder) obtained by the evaporator 4 converting the available heating value 133 into steam of the steam pressure 131; an optimum flow rate calculation circuit 111 which receives the input of the above-mentioned steam pressure 131 and which calculates and outputs a steam flow rate 135 that will maximize the efficiency of the steam turbine 6 (FIG. 2) given the input pressure and based on predetermined relations, and an auxiliary boiler flow rate calculation circuit 112 which receives as input the steam turbine optimum flow rate 135 output from the optimum flow rate calculation circuit 111 and the flow rate 137 of the available steam generated by the above-mentioned evaporator 4 and which outputs an auxiliary boiler flow rate 141 obtained by subtracting the flow rate 137 from the steam turbine optimum flow rate 135 (if the difference turns out to be negative, the flow rate is assumed to be zero).

Here, the details of the evaporator flow rate calculation circuit 114 are the same as shown earlier in FIG. 4. The optimum flow rate calculation circuit 111 is the same as the calculation circuit shown in FIG. 3, and the auxiliary boiler flow rate calculation circuit 112 is the same as the calculation circuit indicated in FIGS. 3 and 4.

Explained below in reference to FIG. 2 is how the entire system operation is controlled using the optimum steam flow rate calculation circuit 1013. The optimum steam flow rate calculation circuit 1013 (FIG. 5) is incorporated in the control device 101 (FIG. 2). Inside the control device 101, the auxiliary boiler optimum flow rate 141 and the steam turbine optimum flow rate 135 are acquired as output from the optimum steam flow rate calculation circuit 1013. Based on the auxiliary boiler optimum flow rate 141 and steam turbine optimum flow rate 135 thus acquired, the operation of the entire system (FIG. 2) is controlled in the same manner as in the case of FIG. 3.

In this system, the optimum flow rate calculation circuit 111 calculates the optimum steam flow rate 135 that will maximize the efficiency of the steam turbine 6 given the steam pressure 131 fluctuating with the conditions of solar heat radiation. The flow rate 141 of the auxiliary boiler 5 is determined (with the auxiliary boiler flow rate calculation circuit 112) by subtracting the retrievable steam amount 137 of the solar heat system from the optimum flow rate 135, in such a manner that the flow rate of the steam supplied to the steam turbine 6 will match the optimum flow rate 135. In this manner, the system can operate the steam turbine 6 continuously with high efficiency.

This system is suitable for cases where the entire system is to be optimally operated following static or dynamic determination of the pressure of the steam turbine in accordance with certain criteria beforehand (independently of the heat recovery conditions of the solar heat system) and in consideration of the heating value that can be recovered by the solar heat system. For example, constant pressure operation is one of such cases.

Also, as in the case of FIG. 3, this system is suitable where this plant is not required to operate in keeping with command values of power generation output and need only generate a retrievable amount of power from solar heat in the face of demand for electric power required by the system 9.

(Sixth Embodiment)

Figure 8:
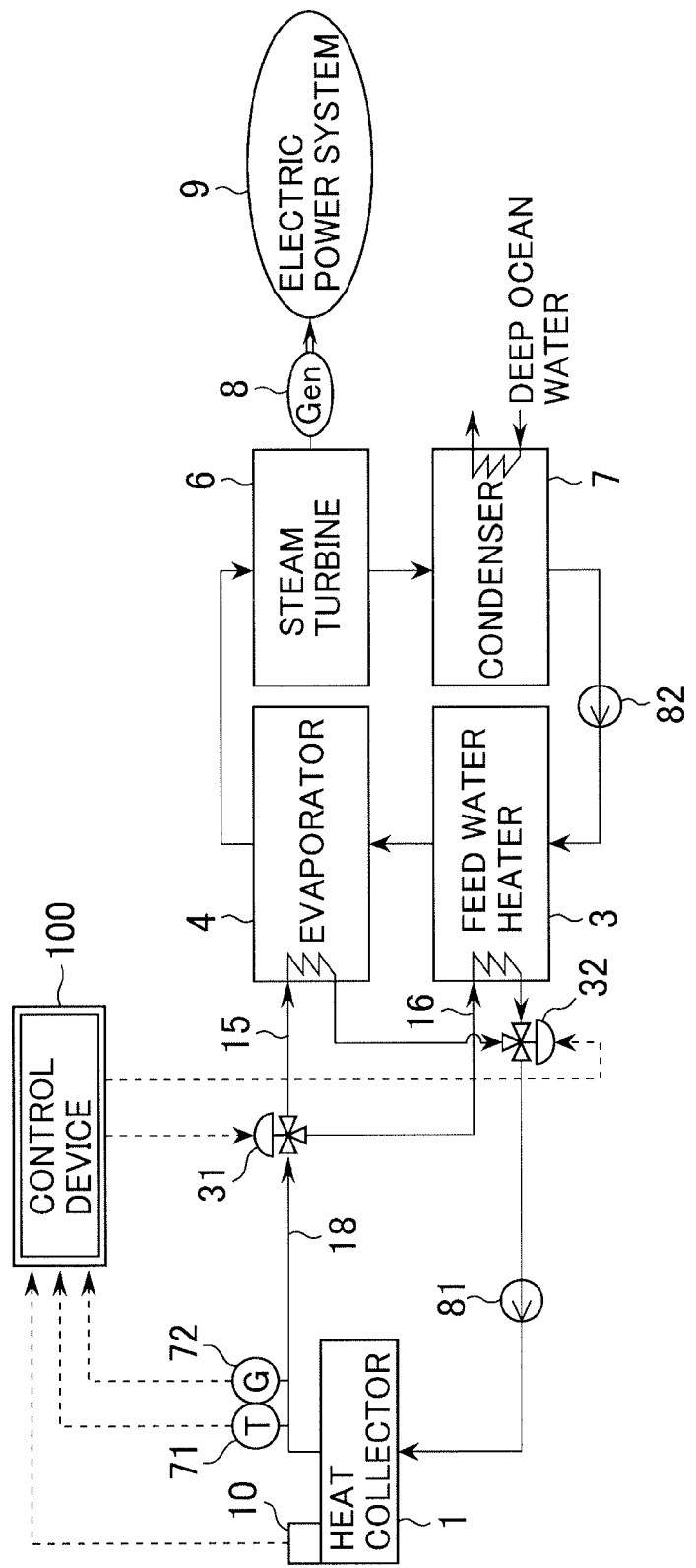
FIG. 8 is a configuration diagram of a solar heat steam cycle system as another embodiment of the present invention.

Compared with the system of the above-described first embodiment (FIG. 1), FIG. 8 shows a system that has no thermal storage device 2 and lets the heat collected by the heat collector 1 be supplied unchecked to the evaporator 4 or feed water heater 3 for heat utilization. The difference from the first embodiment in operation control is that with the first embodiment (FIG. 1), the allocations and switches of heat supply to the evaporator 4 and feed water heater 3 are determined by the control device 100 based on the information about the stored heat amount in the thermal storage device 2, and that with the sixth embodiment, the determination is made based on the information about the heating value collected by the heat collector 1. The information about the collected heat amount is acquired as a heating value using a predetermined method based on the heating value acquired by the collected heat amount acquiring means 10 that measures or estimates the temperature or the gross heating value of the heat collected by the heat collector 1 (generically called the stored heat amount hereunder) or on the basis of the value acquired by the temperature acquiring means 71 and flow rate acquiring means 72 for measuring, estimating, or calculating the temperature and the flow rate of the heating medium supplied from the heat collector 1 to the destination of heat use (evaporator 4 or feed water heater 3). The details of the method for acquiring the collected heat amount are the same as with the second embodiment (FIG. 2) where the collected heat amount acquiring means 10 is used or the same as with the fourth and the fifth embodiments (FIGS. 2, 4 and 5) where the temperature acquiring means 71 and flow rate acquiring means 72 are used. Also, the detailed calculation processes of the control device 100 in the sixth embodiment, i.e., the steps for determining the opening commands of the valves 31 and 32 for switching and adjusting the allocations of heat to the evaporator 4 and feed water heater 3 for use thereby, are substantially the same as in the case of the first embodiment (FIG. 1), except that the stored heat amount signal as part of the input information for the first embodiment (FIG. 1) is replaced with a collected heat amount signal for the sixth embodiment.

Without the thermal storage device 2, this system can still switch the destination of heat use between the evaporator 4 and the feed water heater 3 depending on the fluctuations in the collected heat amount. Thus the system is effective where a simplified system configuration is desired. For example, this system is suitable where a large thermal storage capacity for absorbing the fluctuations in the balance between supply and demand is not necessary, as in the case of the conditions of location entailing relatively limited variations in the collected heat amount or as in the case of relatively small divergences occurring in the circadian variation patterns of the collected heat amount and the demand for electric power, or where the thermal storage device 2 is difficult to set up due to site area restrictions or other constraints.

INDUSTRIAL APPLICABILITY

The present invention can be applied to power generation systems that utilize solar heat.

DESCRIPTION OF REFERENCE NUMERALS

1 Heat collector
2 Thermal storage device
3 Feed water heater
4 Evaporator
5 Auxiliary boiler
6 Steam turbine
7 Condenser
10 Collected heat amount acquiring means
20 Stored heat amount acquiring means
100, 101 Control device
111 Optimum flow rate calculation circuit
112 Auxiliary boiler flow rate calculation circuit
113 Steam turbine optimum operating condition calculation circuit
114 Evaporator flow rate calculation circuit
1011 Optimum auxiliary steam flow rate calculation circuit
1012 Optimum steam pressure/flow rate calculation circuit
1013 Optimum steam flow rate calculation circuit

The invention claimed is:

1. A solar heat steam cycle system comprising:
a heat collector which collects solar thermal energy;
a thermal storage device which stores the solar thermal energy collected by the heat collector;
a feed water heater which heats feed water;
an evaporator which evaporates the feed water supplied from the feed water heater;
a steam turbine driven by steam generated by the evaporator;
a control valve which controls allocations of heating medium supplied from said thermal storage device to said evaporator and said feed water heater;
a temperature sensor which measures a temperature of the heating medium stored in the thermal storage device; and
a controller which receives as input a stored heat amount of the thermal storage device calculated based on the temperature measured by the temperature sensor to determine opening of said control valve in such a manner that allocation of the heating medium supplied to said evaporator is relatively increased when the stored heat amount is larger than a predetermined criterion and that allocation of the heating medium supplied to said feed water heater is relatively increased when said stored heat amount is smaller than the predetermined criterion.

2. The solar heat steam cycle system according to claim 1,
wherein the controller determines opening of said control valve in such a manner that the allocation of the heating medium supplied to said evaporator is set to 100% when said stored heat amount is larger than a predetermined criterion and that the allocation of the heating medium supplied to said feed water heater is set to 100% when said stored heat amount is smaller than the predetermined criterion.

3. A solar heat steam cycle system comprising:
a heat collector which collects solar thermal energy;
a feed water heater which heats feed water;
an evaporator which evaporates the feed water supplied from the feed water heater;
a steam turbine driven by steam generated by the evaporator;
a control valve which controls allocations of a heating medium supplied from said heat collector to said evaporator and said feed water heater;
a temperature sensor which measures a temperature of the heating medium flowing through the heat collector; and
a controller which receives as input a collected heat amount of the heat collector calculated based on the temperature measured by the temperature sensor to determine opening of said control valve in such a manner that allocation of the heating medium supplied to said evaporator is relatively increased when the collected heat amount is larger than a predetermined criterion and that allocation of the heating medium supplied to said feed water heater is relatively increased when said collected heat amount is smaller than the predetermined criterion.

4. The solar heat steam cycle system according to claim 3,
wherein the controller determines opening of said control valve in such a manner that the allocation of the heating medium supplied to said evaporator is set to 100% when the collected heat amount is larger than a predetermined criterion and that the allocation of the heating medium supplied to said feed water heater is set to 100% when said collected heat amount is smaller than the predetermined criterion.

5. A solar heat steam cycle system comprising:
a heat collector which collects solar thermal energy;
a thermal storage device which stores the solar thermal energy collected by the heat collector;
a feed water heater which heats feed water;
an evaporator which evaporates the feed water supplied from the feed water heater;
a steam turbine driven by steam generated by the evaporator;
a control valve which controls allocations of heating medium supply from said heat collector to said evaporator, said feed water heater, and said thermal storage device;
a temperature sensor which measures a temperature of the heating medium flowing through the heat collector; and
a controller which receives as input a collected heat amount of the heat collector calculated based on the temperature measured by the temperature sensor to determine opening of said control valve in such a manner that allocation of the heating medium supplied to said evaporator is relatively increased when collected heat amount is larger than a predetermined criterion and that allocation of the heating medium supplied to said feed water heater or said thermal storage device is relatively increased when said collected heat amount is smaller than the predetermined criterion.

6. The solar heat steam cycle system according to claim 5,
wherein the controller determines opening of said control valve in such a manner that the allocation of the heating medium supplied to said evaporator is set to 100% when the collected heat amount is larger than a predetermined criterion and that the allocation of the heating medium supplied to said evaporator is set to 0% when said collected heat amount is smaller than the predetermined criterion.

7. The solar heat steam cycle system according to claim 5, further comprising:
an auxiliary boiler supplied with the feed water heated by said feed water heater;
a pressure sensor which measures steam pressure in said evaporator; and
a flow rate sensor which measures steam flow rate;
wherein the controller calculates flow rate of the feed water supplied to said auxiliary boiler based on the steam pressure and the steam flow rate measured by said pressure sensor and said flow rate sensor.

8. The solar heat steam cycle system according to claim 7, wherein said controller:
receives as input the steam pressure acquired by said pressure sensor to calculate a steam flow rate for maximizing the efficiency of the steam turbine; and
calculates the flow rate of the feed water to said auxiliary boiler based on the steam flow rate acquired by said flow rate sensor and the steam flow rate output.

9. The solar heat steam cycle system according to claim 5, further comprising:
an auxiliary boiler supplied with the feed water heated by said feed water heater;
wherein the controller receives a retrievable heating value regarding either heat collected by said heat collector or gross heating value stored in said thermal storage device; and
wherein the controller calculates flow rate of the feed water supplied to said auxiliary boiler based on the retrievable heating value and on demand for electric power generated by driving said steam turbine.

10. The solar heat steam cycle system according to claim 9, wherein said controller:
receives said demand for electric power as input to calculate a steam pressure and a steam flow rate for maximizing the efficiency of the steam turbine;
receives as input the steam pressure and the retrievable heating value to calculate a retrievable steam flow rate; and calculates the flow rate of the feed water to said auxiliary boiler based on the retrievable steam flow rate and the steam flow rate output.

11. The solar heat steam cycle system according to claim 5, further comprising:
an auxiliary boiler supplied with the feed water heated by said feed water heater; and
a pressure sensor which measures steam pressure in said evaporator;
wherein the controller receives a retrievable heating value regarding either heat collected by said heat collector or gross heating value stored in said thermal storage device; and
wherein the controller calculates flow rate of the feed water supplied to said auxiliary boiler based on the retrievable heating value and on the steam pressure measured by said pressure sensor.

12. The solar heat steam cycle system according to claim 11, wherein said controller:
receives as input the heating value and the steam pressure to calculate and output a retrievable steam flow rate;
receives as input the steam pressure to calculate and output a steam flow rate for maximizing the efficiency of the steam turbine; and
calculates the flow rate of the feed water to said auxiliary boiler based on the retrievable steam flow rate and the steam flow rate.

13. A control method for use with a solar heat steam cycle system including:
a heat collector which collects solar thermal energy;
a thermal storage device which stores the solar thermal energy collected by the heat collector;
a feed water heater which heats feed water;
an evaporator which evaporates the feed water supplied from the feed water heater;
a steam turbine driven by steam generated by the evaporator;
a temperature sensor which measures a temperature of the heating medium stored in the thermal storage device; and
a controller which receives as input a stored heat amount of the thermal storage device calculated based on the temperature measured by the temperature sensor to determine opening of said control valve;
said control method comprising controlling allocations of heating medium supplied from said thermal storage device to said evaporator and said feed water heater by determining opening of said control valve in such a manner that allocation of the heating medium supplied to said evaporator is relatively increased when the stored heat amount is larger than a predetermined criterion and that the allocation of the heating medium supplied to said feed water heater is relatively increased when said stored heat amount is smaller than the predetermined criterion based on the stored heat amount in said thermal storage device.

* * * * *